United States Patent
Waters

[11] Patent Number: 5,141,160
[45] Date of Patent: Aug. 25, 1992

[54] WINDSHIELD DEICING APPARATUS

[76] Inventor: Jimmy D. Waters, 10 Cross Point, Greenville, S.C. 29607

[21] Appl. No.: 520,101
[22] Filed: May 7, 1990
[51] Int. Cl.⁵ .................................................. B60S 1/46
[52] U.S. Cl. ............................. 239/284.1; 15/250.01
[58] Field of Search ..................... 239/284.1, 284.2; 15/250.01, 250.04, 250 A, 250 R

[56] References Cited

U.S. PATENT DOCUMENTS

| | | | |
|---|---|---|---|
| 1,920,730 | 8/1933 | Wiseman | 15/250.04 |
| 2,240,013 | 8/1941 | Gale | 239/284.1 |
| 2,622,261 | 12/1952 | Smith | 15/250.04 |
| 2,648,865 | 8/1953 | Gordon et al. | 15/250.04 |
| 3,014,814 | 12/1961 | McConica, III | 15/250.01 |
| 3,135,004 | 6/1964 | Naigraw | 15/250.01 |
| 3,286,932 | 11/1966 | Kibler | 239/284.1 |
| 3,447,186 | 6/1969 | Senkewich | 15/250.04 |
| 3,760,451 | 9/1973 | Steed | 15/250.04 |
| 3,776,775 | 12/1973 | Lazarus | 222/130 |
| 4,090,668 | 5/1978 | Kochenour | 15/250.04 |

FOREIGN PATENT DOCUMENTS

| | | | |
|---|---|---|---|
| 3342384 | 6/1984 | Fed. Rep. of Germany | 15/250.01 |
| 191454 | 8/1986 | Japan | 15/250.01 |

Primary Examiner—Andres Kashnikow
Assistant Examiner—Karen B. Merritt
Attorney, Agent, or Firm—Ralph Bailey

[57] ABSTRACT

Apparatus for deicing the windshield of a vehicle having a windshield washer has a pump for supplying wash fluid to the washer and a pressurized container releasing methanol responsive to a solenoid operated valve for mixing with the wash fluid supplied by the pump to the windshield as a result of pressure in the container.

2 Claims, 1 Drawing Sheet

WINDSHIELD DEICING APPARATUS

BACKGROUND OF THE INVENTION

Many efforts have been made to solve the problem of deicing windshields to prevent the accumulation of ice on freezing mornings. U.S. Pat. No. 3,014,814 illustrates an apparatus which has been proposed for applying deicing fluid by pumping same from a container for application through the nozzles of a windshield washer directly to the windshield without mixing. Such an apparatus requires the use of a pump and is of limited effectiveness in preventing ice accumulations since the deicing fluid is applied without mixing with any other fluid to the windshield. Other patents which relate to deicing include U.S. Pat. Nos. 1,920,730; 2,240,013; 2,622,261; 2,648,865; 3,135,004; 3,447,186; and 4,090,668.

Accordingly, it is an important object of this invention to provide a deicing apparatus for use on vehicle windshields and the like wherein a deicer fluid such as methanol is supplied from a pressurized container for mixing with wash fluid which is pumped from a supply to the nozzles of the windshield washer to enhance its effectiveness in the mixture.

Another important object of the invention is the provision of an apparatus for deicing the windshield of a vehicle utilizing a mixture of deicing liquid and wash fluid as would be supplied by the windshield washer system of the vehicle.

SUMMARY OF THE INVENTION

It has been found that a pressurized container of methanol may be utilized to supply deicing fluid for mixing to the wash fluid pumped from the regular source of wash liquid to the nozzles of a windshield washer of an automobile and the like. The supply of the deicer liquid is controlled by the use of a solenoid operated valve and the like responsive to a switch in the vehicle causing the flow of deicer fluid to mix with the pumped supply of wash fluid responsive to pressure in the pressurized container.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein.

DESCRIPTION OF A PREFERRED EMBODIMENT

Figure 1:
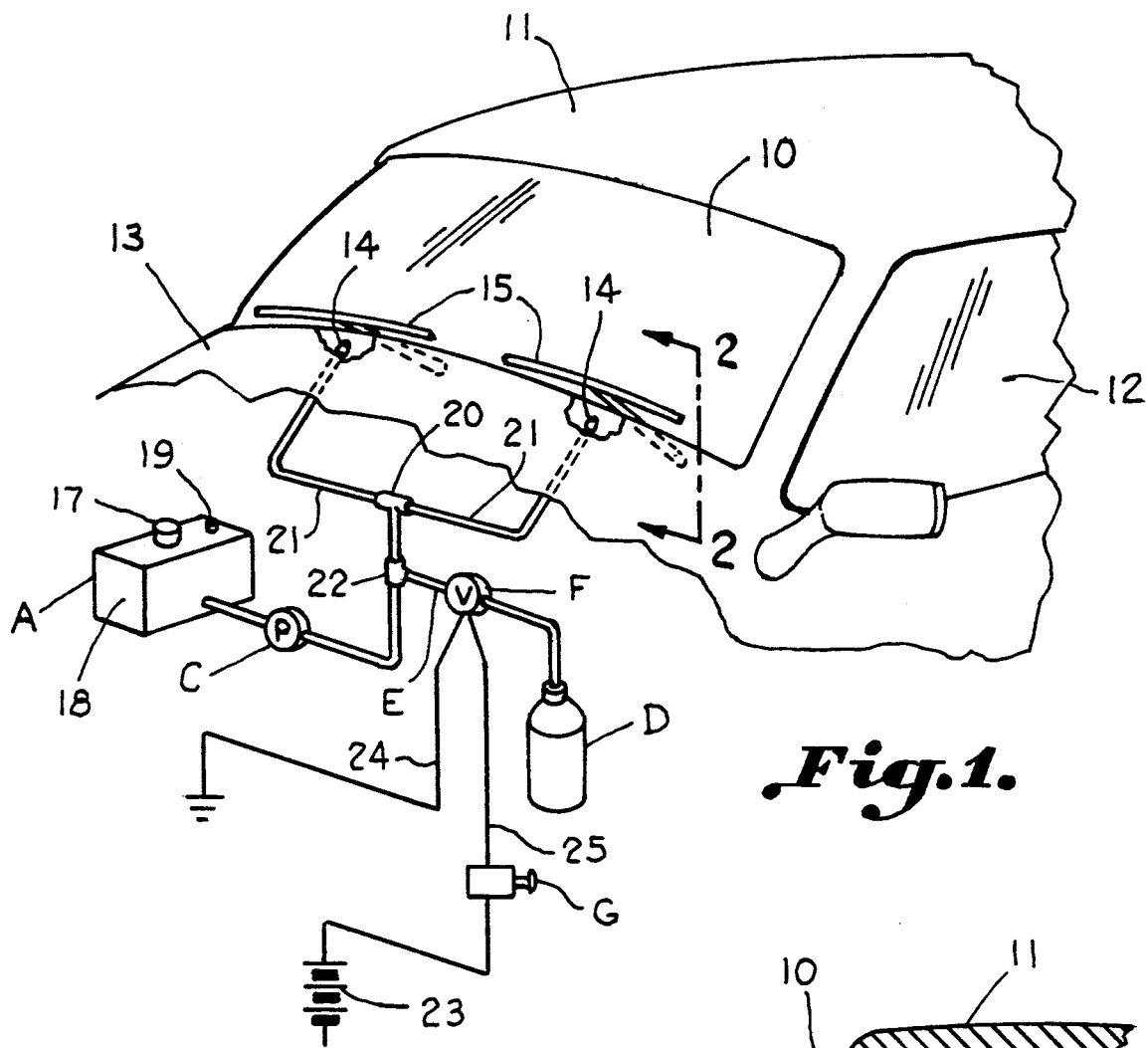
FIG. 1 is a perspective view illustrating an automobile equipped with a windshield deicing apparatus constructed in accordance with the present invention wherein the deicing apparatus is shown schematically in connection with the nozzles of the windshield washer.

Apparatus for deicing a windshield of a vehicle having a washer including a nozzle for spraying the wash fluid upon the windshield includes a source of wash fluid A. A first fluid line B connects the source of wash fluid to the nozzle. A pump C supplies wash fluid through the first line to the nozzle for spraying the wash fluid upon the windshield. A pressurized container of deicer fluid D is provided with a second fluid line E connecting the container of deicer liquid to the first line between the source of wash fluid and the nozzle. A solenoid operated valve F is carried in the second line normally closing the second line to fluid flow as a result of pressure in the container. A switch G in the vehicle is provided for actuating the solenoid valve opening the second line to the flow of deicer fluid responsive to pressure in the pressurized container. Thus, flow from the pressurized container mixes with flow from the pump for delivery to the windshield. Preferably the deicer liquid is methanol.

Referring more particularly to the drawing, an automobile is illustrated having a windshield 10. The vehicle includes a roof 11, side windows 12 and a hood 13. The usual windshield washer system is illustrated as including nozzles 14 and windshield wipers 15.

Figure 2:
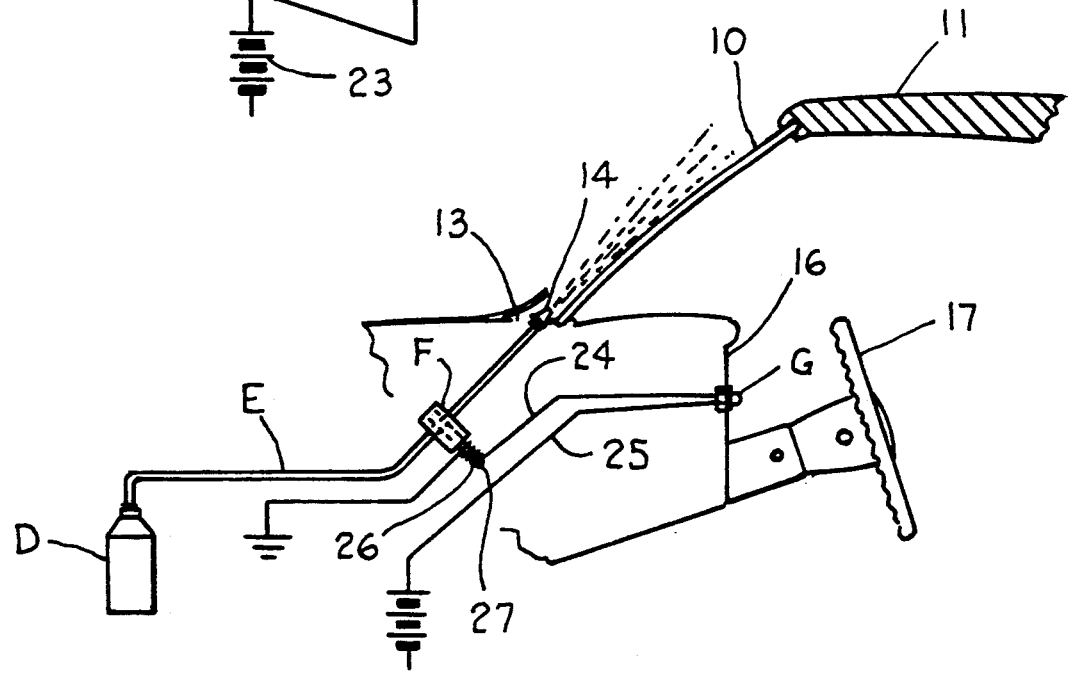
FIG. 2 is a longitudinal sectional elevation taken on the line 2—2 in FIG. 1.

Referring to FIG. 2, the switch G in the vehicle is illustrated as being positioned within the passenger compartment upon the dashboard 16 adjacent the steering wheel 17.

The source of wash fluid A is schematically illustrated as being positioned as usual beneath the hood 13 and is equipped with an opening 17 for introducing additional wash liquid 18 within the tank which may be vented as at 19. The first fluid line B connects the source of wash fluid through the pump C to the nozzles through a Tee coupling 20 to line 21 which deliver wash fluid to the nozzles 14. The pressurized container of deicer fluid D is connected through the second fluid line E and the valve F to a Tee connection 22. The solenoid valve is energized through the push button switch G by a suitable battery 23 and the lines 24 and 25. The solenoid valve F is illustrated in FIG. 2 as including the usual coil 26 and core 27.

It is thus seen that a simplified and improved apparatus for deicing the windshield of a vehicle has been provided utilizing the pressure in a container of deicing fluid such as methanol to operate responsive to a solenoid operated valve and the like to mix as a result of the pressure in the container with wash fluid which is normally pumped directly to the nozzles of the windshield washer. The solenoid operated valve controlling the release of the deicer fluid is controlled by a switch in the vehicle which is preferably carried in the passenger compartment upon the dashboard.

While a preferred embodiment of the invention has been described using specific terms, such description is for illustrative purposes only, and it is to be understood that changes and variations may be made without departing from the spirit or scope of the following claims.

What is claimed is:

1. Apparatus for deicing a windshield of a vehicle having a washer including a nozzle for spraying the wash fluid upon the windshield comprising:
   a source of wash fluid;
   a first fluid line connecting said source of wash fluid to said nozzle;
   a pump for supplying wash fluid through said first line to said nozzle for spraying said wash fluid upon said windshield;
   a pressurized container of deicer fluid;
   a second fluid line connected on one end thereof to said first fluid line through a Tee connection and on an end opposite said end to said container of deicer fluid thus directly connecting said container of deicer to said first line between said source of wash fluid and said nozzle;

a solenoid operated valve in said second line normally closing said second line to fluid flow as a result of pressure in said container; and a switch in said vehicle for actuating said solenoid valve opening said second line to fluid flow as a result of pressure in said container;

whereby flow from the pressurized container mixes with flow from the pump at said Tee connection for delivery to the windshield.

2. The structure set forth in claim 1 wherein said deicer fluid is methanol.

* * * * *